(12) United States Patent
Nakanishi et al.

(10) Patent No.: US 6,589,627 B1
(45) Date of Patent: Jul. 8, 2003

(54) CORDIERITE HONEYCOMB STRUCTURAL BODY AND ITS PRODUCTION PROCESS

(75) Inventors: Tomohiko Nakanishi, Nishio (JP); Masanori Yamada, Nishio (JP); Yosiyasu Andou, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/526,630

(22) Filed: Mar. 16, 2000

(30) Foreign Application Priority Data

May 24, 1999 (JP) .......................................... 11-142660

(51) Int. Cl.$^7$ ................................................. B32B 3/12
(52) U.S. Cl. ...................... 428/116; 264/630; 264/631; 428/34.4; 428/35.7; 428/178; 428/188
(58) Field of Search ................................ 428/116, 118, 428/34.4, 35.7, 174, 178, 188; 264/630, 631

(56) References Cited

U.S. PATENT DOCUMENTS 5,997,984 A * 12/1999 Koike et al.

FOREIGN PATENT DOCUMENTS

JP          07-138077          5/1995

OTHER PUBLICATIONS

SHIN–ETSU "Metolose" data sheet.*

* cited by examiner

*Primary Examiner*—Deborah Jones
*Assistant Examiner*—Wendy Boss
(74) *Attorney, Agent, or Firm*—Harness, Dickey & Pierce, PLC

(57) ABSTRACT

There is provided a cordierite honeycomb structural body that allows the thickness of the cell walls to be reduced and heat capacity to be decreased by improving the fluidity of the molding material when passing through a mold for extrusion molding while maintaining the shape retention of the molding material. A water-soluble cellulose ether is used as a binder that is added to a cordierite-converted starting material. This water-soluble cellulose ether contains methoxyl groups substituted for the cellulose hydroxyl groups within the range of a substitution rate of 27.5 to 31.5%, does not contain hydroxypropoxyl groups and hydroxyethoxyl groups in an amount greater than the amount of unavoidable impurities (0.1 wt %), and has a viscosity in a 2 wt % aqueous solution at 20° C. of less than 8000 centipoise. As a result of adding this water-soluble cellulose ether in an amount of 3 wt % to 10 wt % relative to the amount of the cordierite-converted starting material, frictional resistance is decreased allowing improvement of fluidity while maintaining adequate hardness of the molding material.

6 Claims, 1 Drawing Sheet

CORDIERITE HONEYCOMB STRUCTURAL BODY AND ITS PRODUCTION PROCESS

BACKGROUND OF THE INVENTION

1. Field of the Invention

The present invention relates to a cordierite honeycomb structural body used as a catalyst carrier for an exhaust gas purification catalyst in an internal combustion engine such as an automobile engine, and to a process for producing that cordierite honeycomb structural body.

2. Description of the Related Art

Accompanying the increasing severity of automobile emissions controls in recent years, there has been a demand for reducing hydrocarbon emissions immediately after engines are started through more rapid activation of exhaust gas purification catalysts. Since reducing the heat capacity of the honeycomb structural body serving as the catalyst carrier is effective for more rapid activation of the catalyst, it is therefore necessary to reduce the thickness of cell walls to achieve this.

In general, a honeycomb structural body made of cordierite is suitably used for catalyst carriers. For example, as described in Japanese Unexamined Patent Publication (Kokai) No. 7-138077, a cordierite honeycomb structural body is produced by adding molding aids such as binder, lubricant and humectant, as necessary, to a cordierite-converted starting material, followed by kneading with a liquid medium and extrusion molding the resulting molding material. A mold for extrusion molding having honeycomb-shaped extrusion channels and a feed path through which molding material is supplied to the extrusion channels is normally used for extrusion molding of the honeycomb structural body. Molding material supplied to the intersections of the extrusion channels from the feed path is pressed together in the extrusion channels to obtain a honeycomb-shaped molded body.

However, when molding is attempted by reducing the thickness of the cell walls of the cordierite honeycomb structural body to less than that of the prior art to, for example, 100 μm or less, the width of the extrusion channels becomes less and the resistance present when the molding material passes through the extrusion channels increases significantly. Consequently, the surfaces of the outer wall or cell walls of the formed honeycomb structural body are finely split, or molding material is unable to adequately fill the insides of the extrusion channels due to frictional resistance between the mold walls and molding material, whereby the molding material is extruded without being pressed together, thereby leading to the problem of preventing the formation of a honeycomb shape.

On the other hand, it is also possible to soften the molding material to reduce the frictional resistance. Although fluidity is improved by softening the molding material, the shape retention of the extrusion molded honeycomb structural body decreases, resulting in the problem of it being easily deformed by its own weight or external force.

Therefore, the object of the present invention is to obtain a cordierite honeycomb structural body that makes it possible to reduce the thickness of the cell walls and reduce heat capacity by improving the fluidity of the molding material during passage through the extrusion mold while maintaining the shape retention of the molding material.

SUMMARY OF THE INVENTION

The first aspect of the present invention comprises a cordierite honeycomb structural body comprising addition of a binder to a cordierite-converted starting material, kneading and extrusion molding of the resulting molding material. The above-mentioned binder is a water-soluble cellulose ether that contains methoxyl groups substituted for the cellulose hydroxyl groups within the range of a substitution rate of 27.5 to 31.5%, does not contain hydroxypropoxyl groups and hydroxyethoxyl groups in an amount greater than the amount of unavoidable impurities (0.1%), and has a viscosity in a 2 wt % aqueous solution at 20° C. of less than 8000 centipoise. The amount of this water-soluble cellulose ether added is within the range of more than 3 wt % and not more than 10 wt % relative to the amount of cordierite-converted starting material.

Use of the prescribed amount of the above-mentioned specific water-soluble cellulose ether as binder makes it possible to improve fluidity during passage through the mold for extrusion molding while maintaining the shape retention of the molding material. This is the result of improving fluidity by decreasing frictional resistance, since the distance between starting material particles increases as a result of a substance like the above-mentioned specific water-soluble cellulose ether having low frictional resistance being inserted between the starting material particles. In addition, since the above-mentioned specific water-soluble cellulose ether is highly hydrophilic and can convert the starting material to a plastic substance even with a small amount of water, it thus becomes a hard molding material and enhances shape retention. Accordingly, a high-quality cordierite honeycomb structural body having low heat capacity can be realized which allows reduction of the thickness of cell walls without lowering moldability.

Another aspect of the present invention is characterized in that, in the production of a cordierite honeycomb structural body by adding a binder to a cordierite-converted starting material, kneading and extrusion molding the resulting molding material, a water-soluble cellulose ether is used as the above-mentioned binder, the water-soluble cellulose ether containing methoxyl groups substituted for the cellulose hydroxyl groups within the range of a substitution rate of 27.5 to 31.5%, not containing hydroxypropoxyl groups and hydroxyethoxyl groups in an amount greater than the amount of unavoidable impurities (0.1%), and having viscosity in a 2 wt % aqueous solution at 20° C. of less than 8000 centipoise, and this water-soluble cellulose ether is added within the range of more than 3 wt % and not more than 10 wt % relative to the amount of cordierite-converted starting material.

According to the above-mentioned process, a high-quality cordierite honeycomb structural body with low heat capacity can be obtained which allows reduction of the thickness of cell walls while realizing both shape retention and fluidity of the molding material for the same reason as in the above-mentioned first aspect.

The above-mentioned water-soluble cellulose ether in either the above-mentioned first or second aspect of the present invention preferably does not contain substitution groups in an amount greater than the amount of unavoidable impurities (0.1 wt %) other than methoxyl groups. Preferably, water-soluble cellulose ether should be used which contains as functional groups only methoxyl groups substituted for the hydroxyl groups of cellulose, since the effect of enhanced shape retention and fluidity is correspondingly higher.

The thickness of the cell walls of the above-mentioned cordierite honeycomb structural body in either the above-mentioned first or second aspect of the present invention is preferably 100 μm or less. If the cell wall thickness is 100 μm or less, the above-mentioned effects of the present invention become prominent, resulting in a high level of usage value.

DESCRIPTION OF THE PREFERRED EMBODIMENTS

Figure 1:
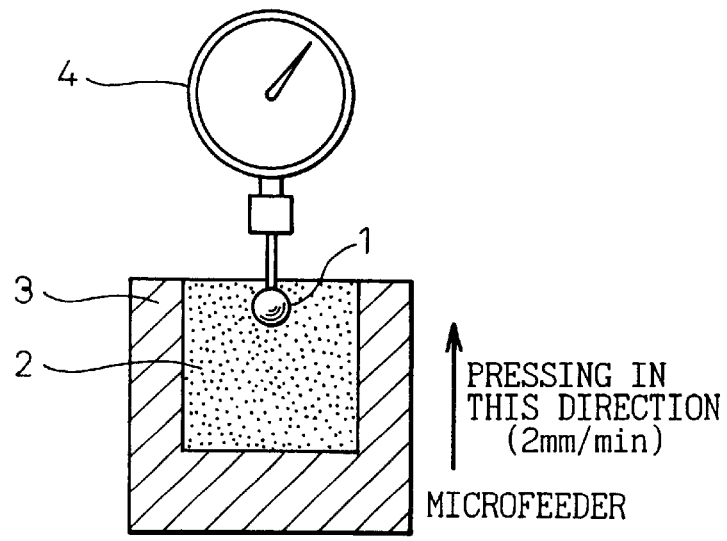
FIG. 1 is a drawing for explaining the method for measuring the hardness of the molding material.

The cordierite honeycomb structural body of the present invention is composed of cordierite having a theoretical composition represented by $2MgO.2Al_2O_3.5SiO_2$, and usually contains cordierite with a composition comprising a ratio of 49.0–53.0 wt % $SiO_2$, 33.0–37.0 wt % $Al_2O_3$ and 11.5–15.5 wt % MgO. Talc ($Mg_3Si_4O_{10}(OH)_2$), kaolin ($Al_2Si_2O_5(OH)_4$), alumina ($Al_2O_3$) or aluminum hydroxide ($Al(OH)_3$) is typically used for the cordierite-converted starting material, and these starting materials are mixed to the above-mentioned theoretical composition to obtain the cordierite-converted starting material. The starting material is not limited to that described above, and oxides, nitrides, carbides, borides, hydroxides, chlorides and the like containing at least one metal element which composes the cordierite can be used.

In the present invention, the prescribed specific water-soluble cellulose ether (generically referred to as methylcellulose) is added as a binder when the mixed cordierite-converted starting material is used as molding material for extrusion molding. Water-soluble cellulose ether is the result of methyl-etherifying the hydroxyl groups of cellulose, and has a structure in which some of the three hydroxyl groups contained in a glucose unit are substituted with methoxyl groups. The substitution rate of methoxyl groups in the water-soluble cellulose ether used in the present invention is within the range of 27.5 to 31.5%, hydroxypropoxyl groups and hydroxyethoxyl groups are not contained in amounts greater than the amount of unavoidable impurities, and the viscosity in a 2 wt % aqueous solution at 20° C. of the cellulose ether is less than 8000 centipoise (cp).

The water-soluble cellulose ether used in the present invention preferably contains methoxyl groups substituted for the cellulose hydroxyl groups within the above-mentioned substitution rate range, and does not contain substitution groups other than methoxyl groups. For example, although hydroxypropoxyl groups and hydroxyethoxyl groups are functional groups that are substituted for hydroxyl groups in the production process of the water-soluble cellulose ether, if their contents exceed the amount of unavoidable impurities, such as when the substitution rate is 4% or more, the fluidity and shape retention of the molding material decrease. Furthermore, if the content of hydroxypropoxyl groups and hydroxyethoxyl groups or other substitution groups is about equal to the amount of unavoidable impurities, they have no effect. In addition, by making the viscosity of the water-soluble cellulose ether used in the present invention less than a prescribed value, the fluidity of the molding material is enhanced. If the viscosity in a 2 wt % aqueous solution at 20° C. is 8000 cp or less in the present invention, fluidity undesirably decreases.

In the present invention, fluidity during extrusion molding is improved while maintaining the shape retention of the molding material by adding this specific water-soluble cellulose ether within the range of more than 3 wt % and not more than 10 wt % relative to 100 wt % of cordierite-converted starting material. If the added amount is 3 wt % or less, shape retention becomes inadequate, while if the amount added exceeds 10 wt %, the molding material becomes too hard. Since this causes an increase in frictional resistance between the mold walls and molding material, there is the risk of occurrence of tearing and cracking of the surface of the honeycomb structural body or of defects such as the molding material not adhering due to the decrease in fluidity, all of which are undesirable.

Molding aids such as lubricant, humectant and other molding aids ordinarily used can be added as necessary to the cordierite-converted starting material in addition to the above-mentioned specific water-soluble cellulose ether. This cordierite-converted starting material is formed into a plasticized molding material which allows extrusion molding by adding a water-soluble cellulose ether as binder, these molding aids and water as a liquid medium followed by kneading. A honeycomb structural body is then obtained by forming this molding material into a round bar and extrusion molding using a mold for this purpose. A mold for extrusion molding can be used that has a known structure having honeycomb-shaped extrusion channels and a feed path through which molding material is supplied to the extrusion channels. Finished products are normally produced from the extrusion molded honeycomb structural body by drying followed by firing at a temperature equal to or higher than the firing temperature of cordierite.

Molding material containing the prescribed amount of the above-mentioned water-soluble cellulose ether as binder has satisfactory fluidity and shape retention, and is free of molding defects even when the width of the extrusion channels is 100 μm or less. This is believed to be due to the above-mentioned specific water-soluble cellulose ether having low frictional resistance, and as a result of a substance like this being inserted between the particles of starting material, the distance between the particles of starting material is increased, thereby reducing the frictional resistance of the molding material overall and leading to improved fluidity. In addition, since the above-mentioned specific water-soluble cellulose ether is highly hydrophilic and can be converted to a plastic substance even with a small amount of water, it becomes a hard molding material offering enhanced shape retention. Accordingly, a honeycomb structural body having a narrow cell wall thickness can be produced while preventing defects such as tearing and cracking of the surface of the honeycomb structural body and a lack of adhesion of the molding material.

EXAMPLES 1–6

Comparative Examples 1–5

Cordierite honeycomb structural bodies were produced according to the following process in order to confirm the effects of the present invention. Powders of talc, kaolin, alumina and aluminum hydroxide were used as cordierite-converted starting materials, and were mixed to as to approach the theoretical composition of cordierite. Various amounts of water-soluble cellulose ethers of various specificity shown in Table 1 were added to this cordierite-converted starting material. By then adding 0.9 wt % of lubricant (Unilube; Nippon Oil & Fats Co., Ltd.), 2.1 wt % of humectant (glycerin; Wako Pure Chemical Industries, Ltd.) and 20 wt % of water followed by mixing, a molding material was fabricated which was able to be extrusion molded. Here, the above-mentioned wt % is based on 100 wt % of the above-mentioned cordierite-converted starting material. As shown in Table 1, water-soluble cellulose ethers were used in which the substitution rate of methoxyl groups is 27.5–31.5% and viscosity is within the range of 100–5500 cp, and molding materials were obtained by changing the amount of the cellulose ethers added within the range of 3.5–10 wt % relative to 100 wt % of cordierite-converted starting material (Examples 1–6). Furthermore, viscosity was measured using the Brookfield viscometer made by Tokyo Keiki Co., Ltd. for a 2 wt % aqueous solution of water-soluble cellulose ether (20° C.).

TABLE 1

| | Substitution rate | | | | |
|---|---|---|---|---|---|
| | Methoxyl groups | Hydroxy-propoxyl groups | Hydroxy-ethoxyl groups | Viscosity (cp) 2%, 20° C. | Amount Added (wt %) |
| Example 1 | 29.0 | 0 | 0 | 1500 | 8.5 |
| Example 2 | 31.5 | 0 | 0 | 4000 | 8.5 |
| Example 3 | 27.5 | 0 | 0 | 100 | 8.5 |
| Example 4 | 29.0 | 0 | 0 | 1500 | 10 |
| Example 5 | 29.0 | 0 | 0 | 1500 | 3.5 |
| Example 6 | 30.0 | 0 | 0 | 5500 | 5 |
| Comp. Ex. 1 | 29.0 | 5.8 | 0 | 4000 | 8.5 |
| Comp. Ex. 2 | 24.6 | 0 | 6.0 | 4000 | 8.5 |
| Comp. Ex. 3 | 29.5 | 0 | 0 | 8000 | 8.5 |
| Comp. Ex. 4 | 29.0 | 0 | 0 | 1500 | 11 |
| Comp. Ex. 5 | 29.0 | 0 | 0 | 1500 | 3 |

In addition, molding materials were also fabricated by the same process for the sake of comparison of the case in which the water-soluble cellulose ether used as binder contains hydroxypropoxyl groups (Comparative Example 1), the case in which the substitution rate of methoxyl groups is outside the range of the present invention and it contains hydroxyethoxyl groups (Comparative Example 2), the case in which the viscosity in a 2 wt % aqueous solution is outside the range of the present invention (Comparative Example 3), and the case in which the amount of water-soluble cellulose ether added is outside the range of the present invention (Comparative Examples 4 and 5). The types and amounts of lubricant and humectant in these comparative examples are the same as in Example 1. The amount of water used was 18.5 wt % in Comparative Examples 1 and 2 and 20 wt % in Comparative Examples 3 through 5 relative to 100 wt % of the above-mentioned cordierite-converted starting material.

The molding materials of the examples and comparative examples obtained in this manner were respectively molded into round bars for extrusion and extrusion molded using a mold for this purpose to obtain cordierite honeycomb structural bodies. The fluidity, hardness and shape retention of each of the molding materials of the examples and comparative examples, and the state of the outer wall surface of the resulting honeycomb structural bodies, along with the presence of drying cracks, were investigated. The results are shown in Table 2. Here, fluidity was evaluated by the amount of time required to mold 200 mm of honeycomb structural body when molding the molding materials at a molding pressure of 6 MPa using an extrusion mold in which the width of the extrusion channels was 85 μm. Molding materials in which the measured time was 10 seconds or less were indicated with a ○, while those in which the measured time exceeded 10 seconds were indicated with an ×. Hardness was measured using the apparatus shown in FIG. 1 by filling approximately 20 g of molding material 2 into holder 3 having an inner diameter of 24 mm and depth of 25 mm, completely embedding a steel ball 1 having a diameter of 4 mm attached to the end of push-pull gauge 4 in the molding material, moving the above-mentioned holder 3 in the direction of the steel ball at a speed of 2 mm/min with a microfeeder, not shown, which causes the molding material to be pressed against the steel ball, and reading the load displayed on the push-pull gauge 1 minute after the start of this pressing. Shape retention was evaluated by extruding a round bar of molding material having a fixed length (diameter: 10 mm, length: 15 mm), applying a fixed load to that round bar, determining the ratio of the length after deformation to the initial length and indicating by an ○ those molding materials in which this ratio was high (0.7 or more) and by an × those molding materials in which this ratio was low. Thus, molding materials having a lower length ratio tend to be easily deformed by their own weight or external force.

As for the state of the outer wall surface, those cordierite honeycomb structural bodies which were free of tearing and cracks in the surface of the outer wall that occur due to frictional resistance between the molding material and metal wall surfaces of the mold for extrusion molding were indicated with a ○, while those in which definite tearing or cracking were observed were indicated with an ×. With respect to the presence of drying cracks, those cordierite honeycomb structural bodies in which drying cracks were not present in the outer surface or inner cells were indicated with a ○, while those in which cracks were present were indicated with an ×. Moreover, in order to make a comprehensive evaluation based on each property, those cordierite honeycomb structural bodies that had been evaluated with a ○ for all properties of fluidity, hardness, shape retention, outer wall surface and drying cracks were indicated with a ○, while those in which even one of these properties had been evaluated with an × were indicated with an ×.

TABLE 2

| | Honeycomb 200 mm molding time (sec) | Fluidity | Hardness (kg) | Shape retention | Outer wall surface | Drying cracks | Overall evaluation |
|---|---|---|---|---|---|---|---|
| Ex. 1 | 2.3 | ○ | 0.80 | ○ | ○ | ○ | ○ |
| Ex. 2 | 3.5 | ○ | 0.81 | ○ | ○ | ○ | ○ |
| Ex. 3 | 2.9 | ○ | 0.75 | ○ | ○ | ○ | ○ |
| Ex. 4 | 9.1 | ○ | 0.92 | ○ | ○ | ○ | ○ |
| Ex. 5 | 4.5 | ○ | 0.67 | ○ | ○ | ○ | ○ |
| Ex. 6 | 5.4 | ○ | 0.84 | ○ | ○ | ○ | ○ |
| Comp. Ex. 1 | 21.2 | × | 0.45 | × | ○ | ○ | × |
| Comp. Ex. 2 | 14.6 | × | 0.44 | × | ○ | ○ | × |
| Comp. Ex. 3 | 20.2 | × | 0.84 | ○ | × | ○ | × |
| Comp. Ex. 4 | 19.8 | × | 0.97 | ○ | × | ○ | × |
| Comp. Ex. 5 | 4.3 | ○ | 0.42 | × | ○ | × | × |

As is clear from Table 2, in Examples 1–6 that use water-soluble cellulose ether as binder in which the substitution rate of methoxyl groups is 27.5–31.5%, hydroxypropoxyl groups or hydroxyethoxyl groups are not contained, and the viscosity is less than the prescribed value, and said water-soluble cellulose ether is added in an amount of 3 wt % to 10 wt % relative to 100 wt % of the cordierite-converted starting material, fluidity, hardness, shape retention, outer wall surface and drying cracks were all evaluated with a ○, and all were given an overall evaluation of ○.

In contrast, as indicated in Comparative Examples 1 and 2, when water-soluble cellulose ether is used that contains hydroxypropoxyl groups or hydroxyethoxyl groups, both fluidity and shape retention are poor, and it is difficult to obtain a cordierite honeycomb structural body having thin cell walls. In addition, Comparative Example 3, in which, although the water-soluble cellulose ether does not contain hydroxypropoxyl groups or hydroxyethoxyl groups, the viscosity is 8000 cp or more in a 2 wt % aqueous solution at 20° C., results in good shape retention but poor fluidity. In addition, tearing and cracking are observed in the outer surface wall and due to the poor fluidity, frictional resistance can be seen to increase significantly when the molding material passes through the mold. Moreover, as shown in Comparative Example 4, when the amount of water-soluble cellulose ether added is greater than 10 wt %, the molding material becomes excessively hard resulting in good shape retention but poor fluidity, while also causing an increase in frictional resistance that leads to the occurrence of tearing and cracking of the surface. Conversely, as shown in Comparative Example 5, if the amount of water-soluble cellulose ether added is less than 3 wt %, it was found that, although fluidity is good, shape retention is unsatisfactory.

Figure 2:
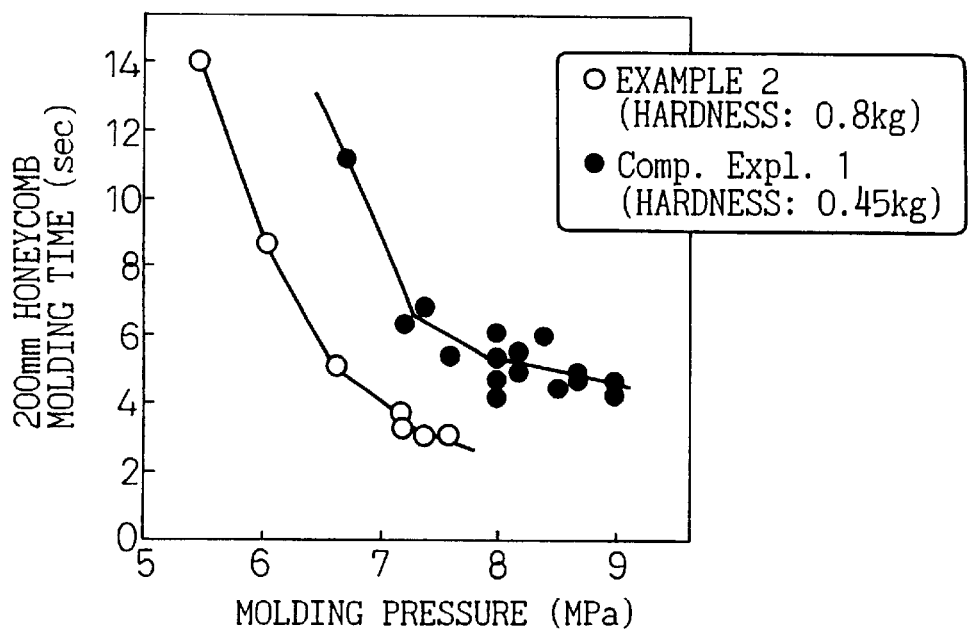
FIG. 2 is a graph showing the molding properties of cordierite honeycomb structural bodies molded using the molding materials of Example 2 of the present invention and Comparative Example 1.

Next, using the molding materials of Example 2 and Comparative Example 1, which were fabricated using the same viscosity of the water-soluble cellulose ether used as binder but changing the substitution rates of methoxyl groups and hydroxypropoxyl groups, the relationship between molding pressure and molding time was investigated during molding of honeycomb structural bodies having a diameter of 100 mm, length of 200 mm and wall thickness of 50 µm. Those results are shown in FIG. 2. As is clear from FIG. 2, in the case of using the molding material of Example 2, the amount of time required to mold a honeycomb structural body of the prescribed length was less than that in the case of the molding material of Comparative Example 1, and fluidity was found to be improved.

As has been described above, according to the present invention, the use as binder of water-soluble cellulose ether that has a viscosity in a 2 wt % aqueous solution at 20° C. of less than 8000 cp, has a methoxyl group substitution rate of 27.5–31.5%, and does not contain hydroxypropoxyl groups or hydroxyethoxyl groups in an amount greater than the amount of unavoidable impurities (0.1%), and the addition of the water-soluble cellulose acetate at an amount of 3 wt % to 10 wt % relative to 100 wt % of cordierite-converted starting material enables improvement of fluidity when the molding material passes through a mold for extrusion molding while maintaining its shape retention. This effect becomes prominent when cell wall thickness is 100 µm or less, and allows the obtaining of a cordierite honeycomb structural body having thin cell walls and good quality. This cordierite honeycomb structural body is suitable for use as a catalyst carrier for an exhaust gas purification catalyst in an internal combustion engine, and allows more rapid activation of the catalyst since it is able to reduce heat capacity.

What is claimed is:

1. A cordierite honeycomb structural body comprising addition of binder to a cordierite-converted starting material, kneading and extrusion molding of the resulting molding material; wherein, said binder is a water-soluble cellulose ether that contains methoxyl groups substituted for the cellulose hydroxyl groups within the range of a substitution rate of 27.5 to 31.5%, does not contain hydroxypropoxyl groups and hydroxyethoxyl groups in an amount greater than 0.1%, and has a viscosity in a 2 wt % aqueous solution at 20° C. of less than 8000 centipoise; and, the amount of said water-soluble cellulose ether added is within the range of more than 3 wt % and not more than 10 wt % relative to the amount of cordierite-converted starting material.

2. A cordierite honeycomb structural body according to claim 1 wherein said water-soluble cellulose ether does not contain substitution groups in an amount greater than 0.1 wt % other than methoxyl groups.

3. A cordierite honeycomb structural body according to claim 1 wherein said cordierite honeycomb structural body includes cell walls having a thickness of 100 µm or less.

4. A process for producing a cordierite honeycomb structural body by adding binder to a cordierite-converted starting material, kneading and extrusion molding the resulting molding material; wherein, a water-soluble cellulose ether is used as the above-mentioned binder, said water-soluble cellulose ether containing methoxyl groups substituted for the cellulose hydroxyl groups within the range of a substitution rate of 27.5 to 31.5%, not containing hydroxypropoxyl groups and hydroxyethoxyl groups in an amount greater than 0.1%, and having viscosity in a 2 wt % aqueous solution at 20° C. of less than 8000 centipoise, and said water-soluble cellulose ether is added within the range of 3 wt % to 10 wt % relative to the amount of the cordierite-converted starting material.

5. A process for producing a cordierite honeycomb structural body according to claim 4 wherein said water-soluble cellulose ether does not contain substitution groups in an amount greater than 0.1 wt % other than methoxyl groups.

6. A process for producing a cordierite honeycomb structural body according to claim 4 wherein said cordierite honeycomb structural body includes cell walls having a thickness of 100 µm or less.

* * * * *